United States Patent
Trabelsi et al.

(10) Patent No.: US 12,346,457 B1
(45) Date of Patent: Jul. 1, 2025

(54) SYSTEM AND METHOD FOR SCANNING PRIVATE CODE AND CI/CD REGISTRIES

(71) Applicant: Wiz, Inc., New York, NY (US)

(72) Inventors: Arnon Trabelsi, Tel Aviv (IL); Daniel Hershko Shemesh, Givat-Shmuel (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/974,123

(22) Filed: Dec. 9, 2024

(51) Int. Cl.
  *G06F 21/57* (2013.01)
  *G06F 8/71* (2018.01)

(52) U.S. Cl.
  CPC .............. *G06F 21/577* (2013.01); *G06F 8/71* (2013.01); *G06F 2221/033* (2013.01)

(58) Field of Classification Search
  None
  See application file for complete search history.

(56) References Cited

U.S. PATENT DOCUMENTS

| | | | |
|---|---|---|---|
| 10,768,929 B1 * | 9/2020 | Turner | G06F 8/71 |
| 10,817,604 B1 * | 10/2020 | Kimball | G06F 21/563 |
| 11,070,496 B1 * | 7/2021 | Rae | G06F 8/71 |
| 11,381,590 B2 | 7/2022 | Alsaeed et al. | |
| 12,052,285 B1 * | 7/2024 | Anjaneyapura Range | H04L 63/20 |
| 2006/0168325 A1 * | 7/2006 | Wood | G06F 16/9574 707/E17.12 |
| 2013/0311986 A1 * | 11/2013 | Arrouye | G06F 8/61 717/175 |
| 2019/0026697 A1 * | 1/2019 | Burton | G06F 8/71 |
| 2020/0097662 A1 * | 3/2020 | Hufsmith | H04L 9/0643 |
| 2022/0013036 A1 | 1/2022 | Sadeh-Koniecpol et al. | |

FOREIGN PATENT DOCUMENTS

WO    WO2021144770 A1 *   7/2021   ............... G06F 9/44

OTHER PUBLICATIONS

Wong et al., "Threat Modeling and Security Analysis of Containers: A Survey" Singapore University of Technology and Design, Nov. 22, 2021 (Year: 2021).*

* cited by examiner

*Primary Examiner* — Paul R Fisher
(74) *Attorney, Agent, or Firm* — M&B IP Analysts, LLC (57) ABSTRACT

A system and method for inspecting private code repositories for cybersecurity issues is presented. The method includes accessing a private code repository, the private code repository including a plurality of code objects; generating a pull request including code for an inspector, the inspector configured to detect a cybersecurity object in a code object of the plurality of code objects; initiating the pull request in the private code repository; and receiving a result from the inspector, wherein the result includes an identifier of the code object and an identifier of a detected cybersecurity object, wherein the cybersecurity object indicates a cybersecurity issue.

11 Claims, 4 Drawing Sheets

SYSTEM AND METHOD FOR SCANNING PRIVATE CODE AND CI/CD REGISTRIES

TECHNICAL FIELD

The present disclosure relates generally to cybersecurity inspection, and specifically for scanning private registries for cybersecurity issues.

BACKGROUND

A private registry is a secure, restricted-access repository used to store and distribute software artifacts, such as container images, code objects, or packages, typically within an organization. It allows teams to manage and control access to proprietary or sensitive resources while enabling secure deployments in development and production environments. Examples include private Docker® registries and artifact repositories like JFrog® Artifactory or Amazon® Web Service (AWS) elastic container registry (ECR).

A problem with scanning code objects in private registries for cybersecurity risks lies in balancing access and security. Security tools require access to the registry to perform scans, which may necessitate elevated permissions. This can inadvertently expose sensitive data or create new attack vectors if access credentials are mismanaged or compromised.

Moreover, private registries often contain a large volume of artifacts, making scans resource-intensive. This can result in delays, bottlenecks, or incomplete scans, particularly if the registry is frequently updated. Another issue is the risk of false positives or blind spots due to limited tool compatibility with specific file formats or custom configurations, which could lead to overlooked vulnerabilities or wasted effort on non-issues. These challenges highlight the complexity of ensuring comprehensive and efficient security assessments in private registries.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include accessing a private code repository, the private code repository including a plurality of code objects. The method may also include generating a pull request including code for an inspector, the inspector configured to detect a cybersecurity object in a code object of the plurality of code objects. The method may furthermore include initiating the pull request in the private code repository. The method may in addition include receiving a result from the inspector, where the result includes an identifier of the code object and an identifier of a detected cybersecurity object, where the cybersecurity object indicates a cybersecurity issue. Other embodiments of this aspect include corresponding computer systems, apparatus, and computer programs recorded on one or more computer storage devices, each configured to perform the actions of the methods.

Implementations may include one or more of the following features. The method may include: generating the pull request in a project of a version control system (VCS), the project associated with an inspection environment. The method may include: configuring an inspection controller in an inspection environment to analyze metadata of the private code repository; and generating code for the inspector based on the analyzed metadata. The method may include: generating a representation of the code object in a security database based on the received result, where the security database includes a representation of a computing environment in which a resource is deployed based on the code object. The method may include: inspecting the resource for another cybersecurity object; and detecting the cybersecurity issue further based on detecting the another cybersecurity object on the resource. The method may include: generating a representation of the resource and the detected cybersecurity object in the security database. The method may include: generating an inspectable disk based on an original disk of the resource; and inspecting the inspectable disk for the another cybersecurity object. The method may include: terminating the inspector in the private code repository. The method where the private code repository is accessible to a cloud computing environment and inaccessible to an inspection environment, the inspection environment configured to receive the result from the inspector. Implementations of the described techniques may include hardware, a method or process, or a computer tangible medium.

In one general aspect, non-transitory computer-readable medium may include one or more instructions that, when executed by one or more processors of a device, cause the device to: access a private code repository, the private code repository including a plurality of code objects; generate a pull request including code for an inspector, the inspector configured to detect a cybersecurity object in a code object of the plurality of code objects; initiate the pull request in the private code repository; and receive a result from the inspector, where the result includes an identifier of the code object and an identifier of a detected cybersecurity object, where the cybersecurity object indicates a cybersecurity issue. Other embodiments of this aspect include corresponding computer systems, apparatus, and computer programs recorded on one or more computer storage devices, each configured to perform the actions of the methods.

In one general aspect, a system may include one or more processors configured to: include access a private code repository, the private code repository including a plurality of code objects. The system may furthermore generate a pull request including code for an inspector, the inspector configured to detect a cybersecurity object in a code object of the plurality of code objects. The system may in addition initiate the pull request in the private code repository. The system may moreover receive a result from the inspector, where the result includes an identifier of the code object and an identifier of a detected cybersecurity object, where the cybersecurity object indicates a cybersecurity issue. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate the pull request in a project of a version control system (VCS), the project associated with an inspection environment. The system where the one or more processors are further configured to: configure an inspection controller in an inspection environment to analyze metadata of the private code repository; and generate code for the inspector based on the analyzed metadata. The system where the one or more processors are further configured to: generate a representation of the code object in a security database based on the received result, where the security database includes a representation of a computing environment in which a resource is deployed based on the code object. The system where the one or more processors are further configured to: inspect the resource for another cybersecurity object; and detect the cybersecurity issue further based on detecting the another cybersecurity object on the resource. The system where the one or more processors are further configured to: generate a representation of the resource and the detected cybersecurity object in the security database. The system where the one or more processors are further configured to: generate an inspectable disk based on an original disk of the resource; and inspect the inspectable disk for the another cybersecurity object. The system where the one or more processors are further configured to: terminate the inspector in the private code repository. The system where the private code repository is accessible to a cloud computing environment and inaccessible to an inspection environment, the inspection environment configured to receive the result from the inspector. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
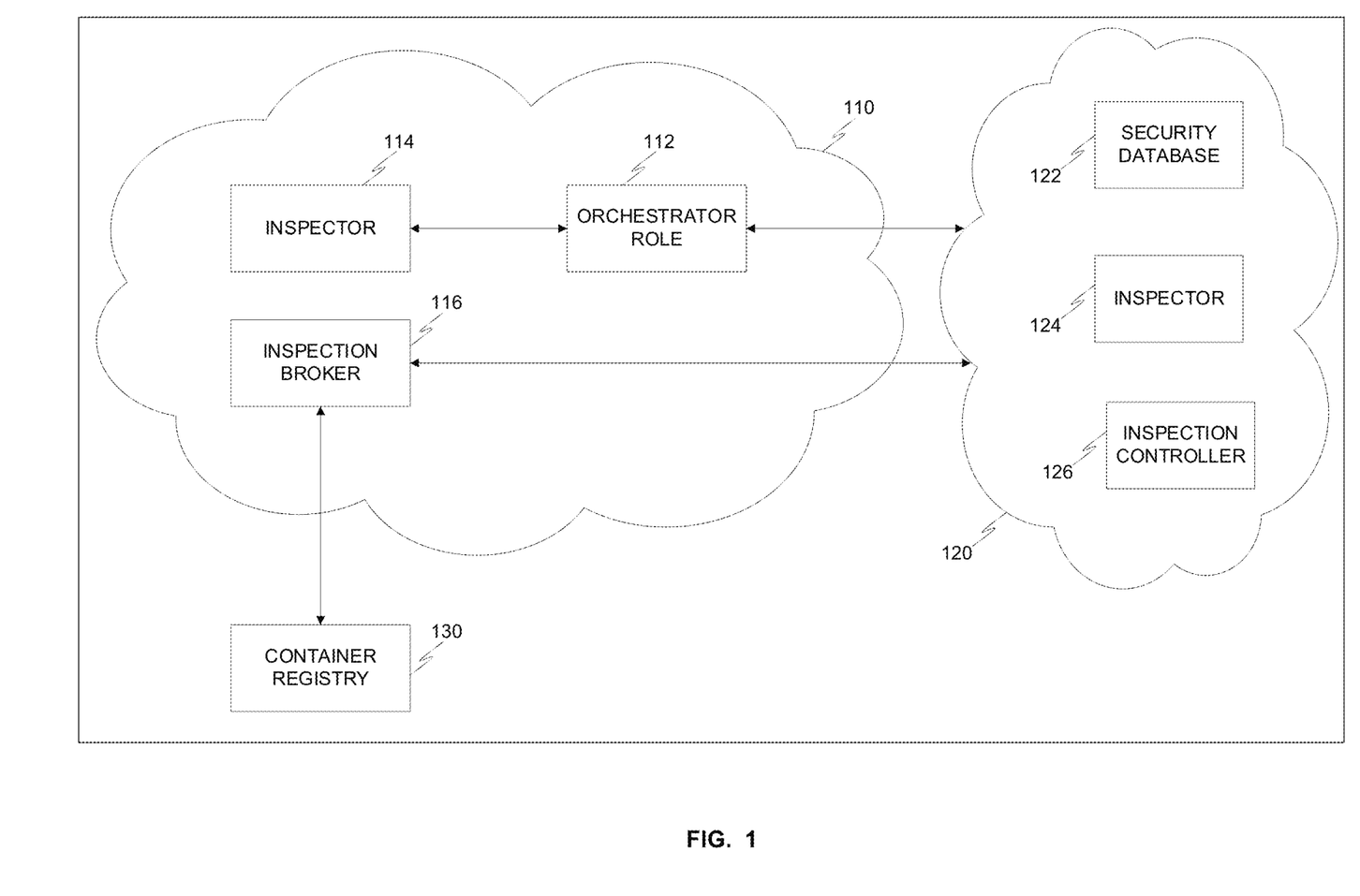
FIG. 1 is an example of a computing environment having a private registry monitored by an inspection environment, implemented in accordance with an embodiment.

FIG. 1 is an example of a computing environment having a private registry monitored by an inspection environment, implemented in accordance with an embodiment. In an embodiment, a computing environment 110 is connected to a container registry 130. In some embodiments, the computing environment 110 is a cloud computing environment, a hybrid computing environment, an on-prem environment, a combination thereof, and the like.

In some embodiments, the computing environment 110 includes a virtual private cloud (VPC), a virtual network (VNet), and the like. In certain embodiments, the computing environment 110 is deployed on a cloud computing infrastructure, such as Amazon® Web Services (AWS), Google® Cloud Platform (GCP), Microsoft® Azure, and the like.

According to an embodiment, the computing environment 110 is connected to the container registry 130, which is configured to store software images therein. In some embodiments, the computing environment 110 is connected to other registries, such as code registries, for example Github®.

In an embodiment, the computing environment 110 further includes resources, principals, and the like, not shown here for simplicity. A resource is, according to an embodiment, a hardware resource, a virtual resource, and the like. For example, in an embodiment, a resource is a virtual machine, a software container, a serverless function, a combination thereof, and the like.

In certain embodiments, a resource is an application, an operating system, a software library, a software binary, various combinations thereof, and the like. In some embodiments, a principal is an entity in a computing environment which is authorized to initiate actions in the computing environment. For example, in an embodiment, a principal is a user account, a service account, a local account, a network account, a user group, a user role, a combination thereof, and the like.

In an embodiment, a computing environment 110 is configured to deploy an inspector 114, an inspection broker 116, a combination thereof, and the like. In certain embodiments, the inspector 114, the inspection broker 116, and the like, are deployed in a virtual private cloud in the computing environment 110.

In some embodiments, the inspector 114 is configured to inspect a workload, a software image, a disk, and the like, for a cybersecurity object. According to an embodiment, a cybersecurity object is a password, a file, a data file, a registry file, an application, an operating system, a certificate, a code object, a software image, a nested workload (e.g., a software container deployed in a virtual machine), a combination thereof, and the like.

In certain embodiments, an inspection broker 116 is configured to access a container registry 130 and retrieve therefrom a list of image stored on the container registry. In an embodiment, the inspection broker 116 is configured to access various registries, repositories, and the like, which are configured to store software objects, code objects, software images, and the like. In an embodiment, a software image is utilized to deploy a virtual machine, a software container, serverless function, and the like virtualizations.

In some embodiments, a software image contains multiple layers, and an inspector 114 is configured to inspect at least a layer of a plurality of layers for a cybersecurity object.

According to an embodiment, an inspection controller 126 is deployed in an inspection environment 120, and is configured to receive a list of software images from an inspection broker 116. In an embodiment, the inspection controller 126 is configured to select a software image for inspection. For example, in an embodiment, the inspection controller 126 selects a software image for inspection based on a timestamp (e.g., inspect a software image every 24 hours), based on a deployment (e.g., detecting that the software image is utilized in deployment of a virtual instance in the computing environment 110), a combination thereof, and the like.

In an embodiment, the inspection environment 120 is configured to assume an orchestrator role 112 in the computing environment 110. In some embodiments, the orchestrator role 112 is configured to deploy, provision, etc., inspector workloads, such as inspector 114, inspection brokers, such as inspection broker 116, and the like.

In some embodiments, an inspection controller 126 is configured to initiate inspection of a software image by assuming the orchestrator role 112 and configuring a workload, such as the inspection broker 116, an inspector 114, and the like, to pull a software image from the container registry 130.

In some embodiments, the inspector 114 is provided access to the software image pulled from the container registry 130 for inspection. In an embodiment, the inspector 114 is configured to generate an inspection result. According to an embodiment, an inspection result includes metadata, for example indicating what cybersecurity object(s) was found on the software image. In certain embodiments, the inspector 114, inspection broker 116, and the like, are implemented in a virtual private cloud (VPC) in the computing environment 110. In some embodiments, a workload, virtual instance, and the like, in the VPC is configured to send the inspection result to the inspection environment 120.

According to an embodiment, the inspection result is utilized in generating a representation of the software image which is stored in a security database 122. In an embodiment, the security database 122 includes a representation of the computing environment 110. For example, in an embodiment, the security database 122 is a graph database (e.g., Neo4j®) and is configured to store representations of resources, principals, enrichments, remediation actions, application endpoints, network objects, code objects, malware objects, vulnerabilities, exposures, misconfigurations, and the like, as nodes in a security graph.

For example, in an embodiment, an inspector 114 is configured to inspect a software image from a container registry 130. The inspector 114 is configured to generate an inspection result, which includes detection of a Windows® operating system, a SSH certificate, and a local user account. In an embodiment, the inspection result is sent to the inspection environment 120, where the security database 122 is configured to generate a representation of the Windows OS, the SSH certificate, the local user account, and the software image on which all the above was detected. In an embodiment, each is represented by a node in a security graph, where the OS node, the certificate node, and the user account node are each connected to a node representing the software image.

This is advantageous, in an embodiment, as it allows the inspection environment 120 to inspect software images in the container registry 130, where the container registry is a private registry which is connected only to the computing environment 110. This is especially advantageous where the container registry 130 is not connected to the internet, or other publicly available network, through which the inspection environment 120 might have otherwise been able to connect to.

Figure 2:
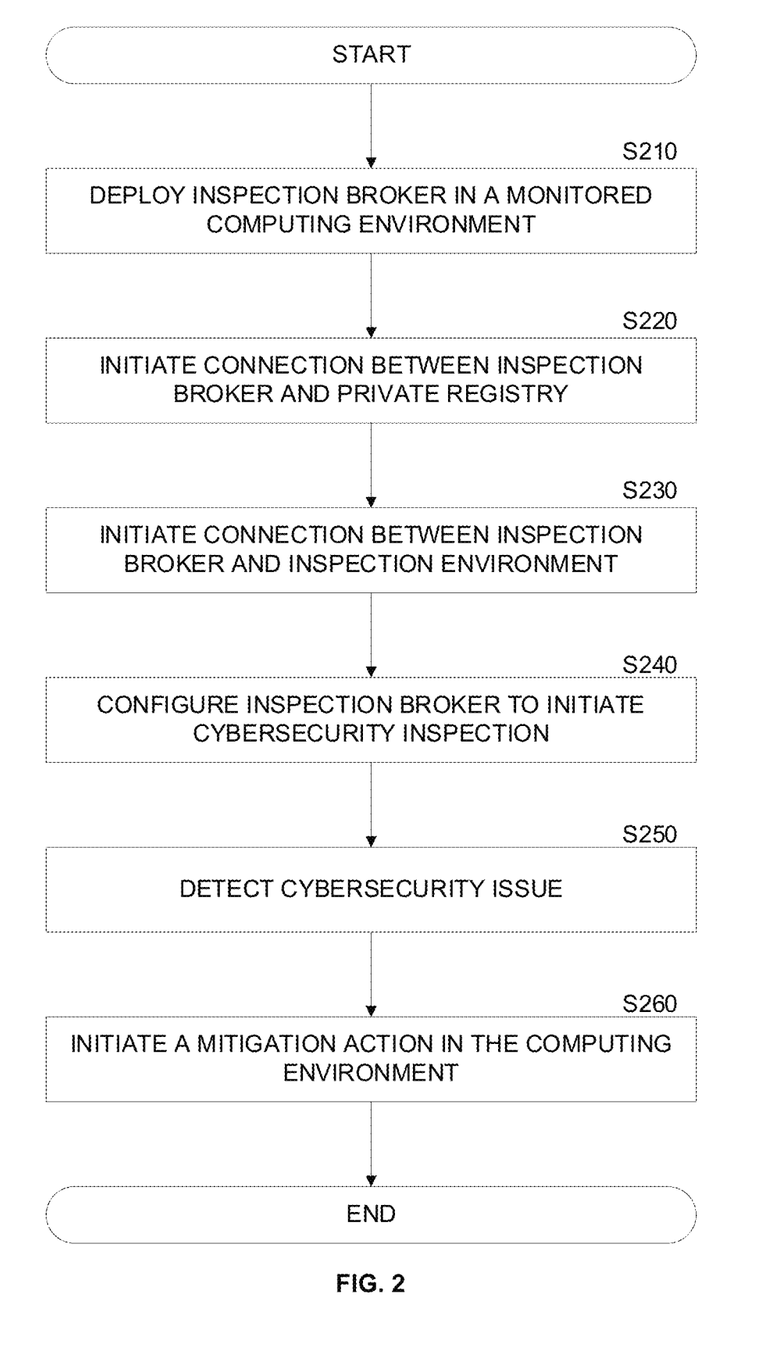
FIG. 2 is an example flowchart of a method for inspecting a software image in a private registry, implemented in accordance with an embodiment.

FIG. 2 is an example flowchart of a method for inspecting a software image in a private registry, implemented in accordance with an embodiment.

At S210, an inspection broker is deployed. In an embodiment, the inspection broker is deployed in a computing environment which is monitored for cybersecurity issues by an inspection environment. For example, in an embodiment, a cybersecurity issue is a cybersecurity threat, a vulnerability, a misconfiguration, an exposure, a combination thereof, and the like.

In some embodiments, a cybersecurity issue is indicated by detection of a cybersecurity object, as discussed in more detail throughout. According to certain embodiments, a cybersecurity issue is detected based on detecting multiple cybersecurity objects, a combination of a cybersecurity object and an exposure, and the like. In an embodiment, this is also referred to as a toxic combination.

At S220, a connection is initiated between the inspection broker and a private registry. In an embodiment, the private registry includes a container registry, a software repository, an image repository, a code repository, a combination thereof, and the like.

In certain embodiments, the private registry is configured to communicate only with the computing environment. For example, in an embodiment, the private registry is configured to block communication from a public network, such as the Internet.

In some embodiments, the inspection broker is deployed in a virtual private cloud (VPC) of the computing environment. In an embodiment, this is advantageous to isolate the inspection broker from the rest of the computing environment.

In certain embodiments, the inspection broker is configured to receive a list of software images, code objects, software binaries, software libraries, etc., which are stored on the private registry. In an embodiment, the inspection broker is configured to send the list to an inspection controller, for example in an inspection environment, which is configured to select a resource for inspection based on the list of identifiers.

At S230, a connection is initiated to an inspection environment. In an embodiment, the inspection environment includes an inspection controller. In some embodiments, the inspection controller is configured to initiate inspection of software images, workloads, resources, virtual disks, various combinations thereof, and the like. In certain embodiments, the inspection broker, the inspector, and the like, are deployed in a VPC in the computing environment, wherein the VPC is connected to the inspection environment, for example by a peering connection, a PrivateLink, and the like.

In some embodiments, the inspection broker is configured to initiate communication with a component of the inspection environment, such as the inspection controller. In an embodiment, the inspection broker is configured to initiate communication via a predetermined network path, including, for example, an IP address, a domain name, a port number, a username, a password, a certificate, a combination thereof, and the like.

At S240, cybersecurity inspection is initiated. In an embodiment, the inspection broker is configured to initiate cybersecurity inspection. In some embodiments, an inspection controller deployed in an inspection environment is configured to initiate cybersecurity inspection, for example by configuring an inspection broker to provision an inspector in the computing environment.

In some embodiments, the inspection broker is configured to access the private registry and retrieve therefrom a software image, a code object, a combination thereof, and the like. In an embodiment, the inspection broker is configured to provide access to the extracted software image, code object, etc. to an inspector, wherein the inspector is deployed in the computing environment.

In certain embodiments, the inspection broker is configured to deploy, provision, and the like, an inspector, wherein the inspector is configured to inspect for a cybersecurity object.

In some embodiments, a cybersecurity object is a password, a file, a data file, a registry file, an application, an operating system, a certificate, a code object, a software image, a nested workload (e.g., a software container deployed in a virtual machine), a malware, a signature, a vulnerability, a misconfiguration, a combination thereof, and the like.

In an embodiment, the software image, code object, and the like, is deleted from the computing environment once inspection is complete. In an embodiment, an inspector is configured to generate an inspection result. In some embodiments, an inspection result includes metadata, data, and the like, which was detected based on inspection of the software image, code object, etc. For example, in an embodiment, a result includes identifiers of each cybersecurity object detected in a software image.

In some embodiments, the inspection result is utilized in generating a representation of the computing environment, for example in a security graph stored in a database in the inspection environment.

At S250, a cybersecurity issue is detected. In an embodiment, the cybersecurity issue is detected based on detecting a cybersecurity object. For example, in an embodiment, a database is detected on a software image. In the embodiment, the database includes a misconfiguration, such that the database is not password protected. According to an embodiment, an unprotected database is a cybersecurity issue.

In some embodiments, the cybersecurity issue is associated with a severity. In an embodiment, the severity includes a score, such as a qualitative score, a quantitative score, a combination thereof, and the like.

In certain embodiments, a representation of the cybersecurity issue is stored in the security database. In an embodiment, the representation of the cybersecurity issue is connected to a representation of the software image on which the cybersecurity issue is detected.

At S260, a mitigation action is initiated. In an embodiment, the mitigation action includes a remediation action. In some embodiments, the remediation action includes a remediation script, selected from a plurality of remediation scripts. In certain embodiments, the remediation script is selected based on the detected cybersecurity issue.

In some embodiments, the mitigation action includes revoking a permission, revoking access to a resource, revoking access from a resource, quarantining a software image, quarantining a code object, generating an alert, generating a severity for an alert, updating an alert, updating a severity for an alert, a combination thereof, and the like.

In an embodiment, the mitigation action includes initiating an inspection. For example, in some embodiments, a nested workload (e.g., a nested virtual machine, software container, serverless function, etc.) is detected from a cybersecurity inspection of a software image. In some embodiments, the mitigation action includes initiating inspection of the nested workload.

Figure 3:
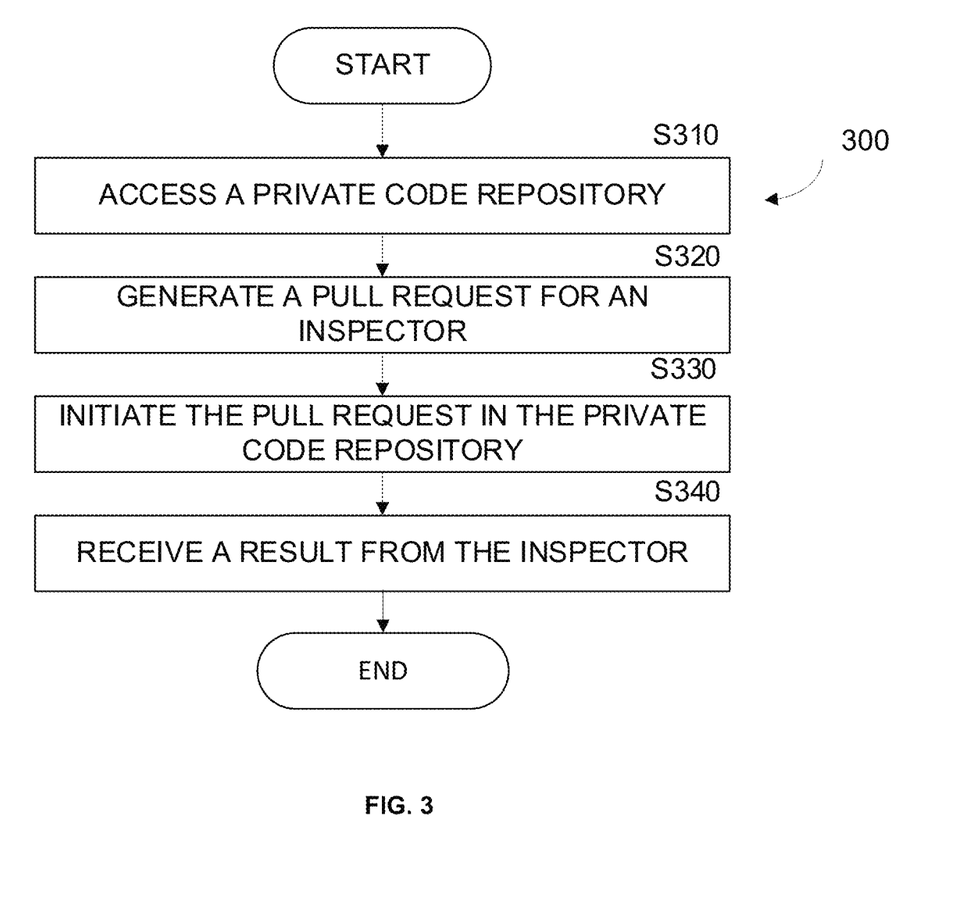
FIG. 3 is an example flowchart of a method for inspecting private code repositories for cybersecurity issues in accordance with an embodiment.

FIG. 3 is an example flowchart 300 of a method for inspecting private code repositories for cybersecurity issues, according to an embodiment.

At S310, a private code repository is accessed. In some embodiments, the private code repository includes a plurality of code objects. In an embodiment, the private code repository provides limited access to individuals (e.g., identities, user accounts, roles, etc.) of certain code objects, files, file history, and the like.

In certain embodiments, the private code repository is accessible to a cloud computing environment and inaccessible to an inspection environment. In an embodiment, the inspection environment is configured to inspect the cloud computing environment, computing environments connected to the cloud computing environment, and the like, for cybersecurity objects. In some embodiments, a cybersecurity object indicates a cybersecurity threat, a cybersecurity risk, a misconfiguration, a vulnerability, an exposure, a combination thereof, and the like.

In an embodiment, the private code repository utilizes a Github® platform. In some embodiments, the private code repository includes code objects, software images, software libraries, software binaries, a combination thereof, and the like.

According to an embodiment, accessing the private code repository includes initiating only certain actions, such as generating a pull request. In an embodiment, the access to the private code repository is partial. For example, in an embodiment, a partial access allows generating a pull request, but does not allow accessing code objects, software images, etc., which are stored on the private code registry.

At S320, a pull request is generated. In certain embodiments, the generated pull request includes code for deploying an inspector workload. In an embodiment, the inspector is configured to detect a cybersecurity object code of the plurality of code objects. In some embodiments, the pull request is generated in a project of a version control system (VCS). In an embodiment, the project is associated with the inspection environment.

According to an embodiment, the pull request is associated with a principal, such as a user account, a service account, a role, and the like. In an embodiment, the principal is authorized to initiate the pull request.

At S330, the pull request is initiated. In some embodiments, the pull request is initiated in the private code repository. In an embodiment, initiating the pull request includes deploying an instance of an inspector in the version control system.

In some embodiments, the inspector is configured to inspect a code object in the repository, version control system, and the like, for a cybersecurity object. In some embodiments, the cybersecurity object is a password, a certificate, a file, a folder, a cryptographic key, a software library, a software binary, a combination thereof, and the like.

At S340, a result is received from the inspector. In some embodiments, the result includes an identifier of the code object and/or an identifier of a detected cybersecurity object. In an embodiment, the cybersecurity object indicates a cybersecurity issue. According to certain embodiments, a cybersecurity issue is detected based on detecting multiple cybersecurity objects, a combination of a cybersecurity object and an exposure, and the like. In another embodiment, a cybersecurity issue is a cybersecurity threat, a vulnerability, a misconfiguration, an exposure, a combination thereof, and the like.

Figure 4:
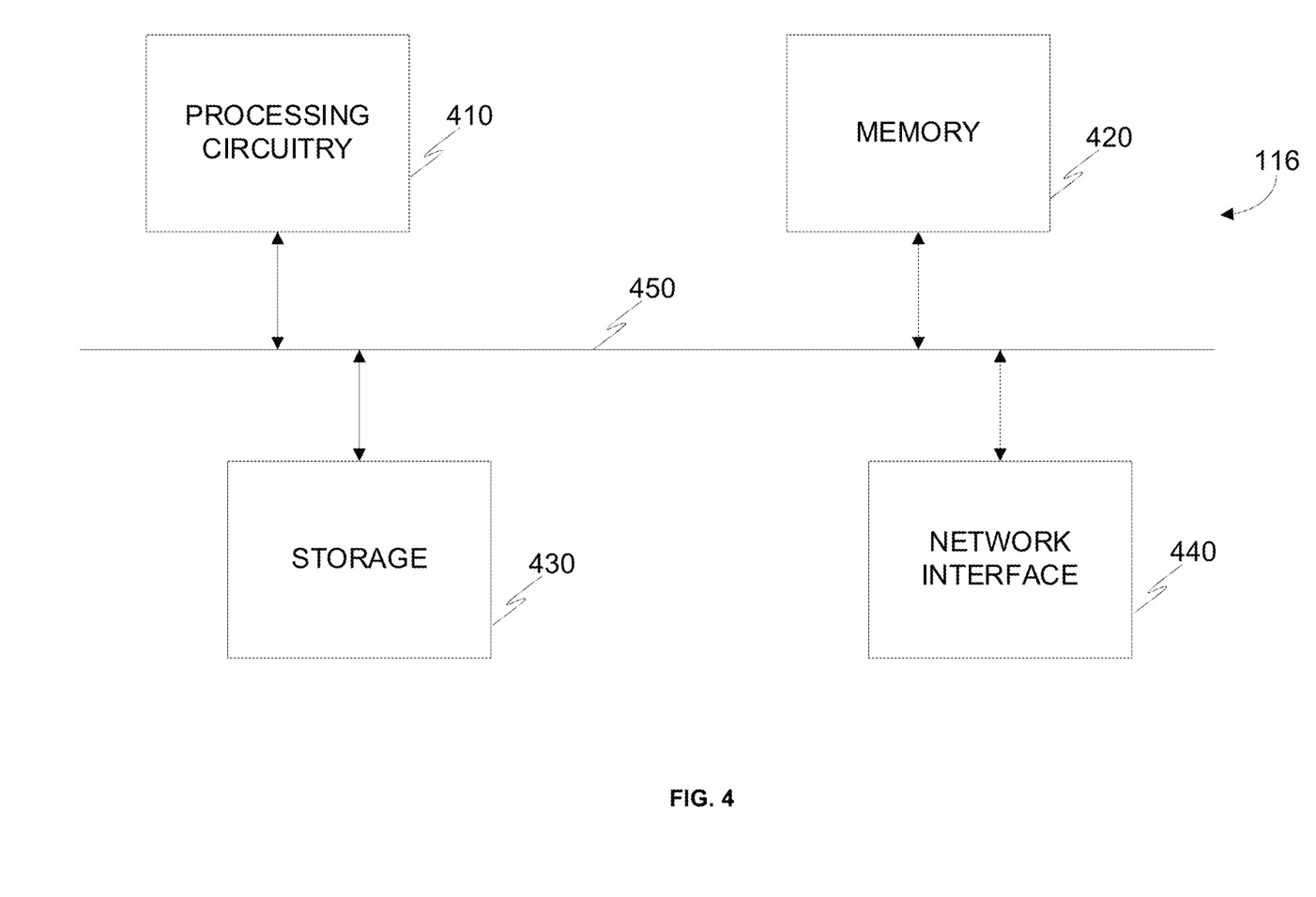
FIG. 4 is an example schematic diagram of an inspection broker in accordance with an embodiment.

FIG. 4 is an example schematic diagram of an inspection broker 116 according to an embodiment. The inspection broker 116 includes, according to an embodiment, a processing circuitry 410 coupled to a memory 420, a storage 430, and a network interface 440. In an embodiment, the components of the inspection broker 116 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the inspection broker 116 with communication with, for example, the inspector 114, the inspection environment 120, and the like, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the inspector 114, the inspector 124, the inspection controller 126, the container registry 130, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting private code repositories for cybersecurity issues, comprising:
    accessing a private code repository, the private code repository including a plurality of code objects, wherein the private code repository is accessible a cloud computing environment;
    generating a pull request including code for an inspector, the inspector configured to detect a cybersecurity object in a code object of the plurality of code objects;
    initiating the pull request in the private code repository;

receiving a result from the inspector at an inspection environment, wherein the private code repository is inaccessible to the inspection environment, and wherein the result includes an identifier of the code object and an identifier of a detected cybersecurity object, and wherein the cybersecurity object indicates a cybersecurity issue;

inspecting a resource for another cybersecurity object, wherein the resource is deployed in the cloud computing environment based on the code object;

detecting the cybersecurity issue based on detecting the cybersecurity object and the another cybersecurity object; and generating a representation of: the code object in a security database based on the received result, the resource, and the detected cybersecurity object, wherein the security database includes a representation of the cloud computing environment.

2. The method of claim 1, further comprising:
generating the pull request in a project of a version control system (VCS), the project associated with an inspection environment.

3. The method of claim 1, further comprising:
configuring an inspection controller in an inspection environment to analyze metadata of the private code repository; and
generating code for the inspector based on the analyzed metadata.

4. The method of claim 1, further comprising:
generating an inspectable disk based on an original disk of the resource; and
inspecting the inspectable disk for the another cybersecurity object.

5. The method of claim 1, further comprising:
terminating the inspector in the private code repository.

6. A non-transitory computer-readable medium storing a set of instructions for inspecting private code repositories for cybersecurity issues, the set of instructions comprising:
one or more instructions that, when executed by one or more processors of a device, cause the device to:
access a private code repository, the private code repository including a plurality of code objects, wherein the private code repository is accessible a cloud computing environment;
generate a pull request including code for an inspector, the inspector configured to detect a cybersecurity object in a code object of the plurality of code objects;
initiate the pull request in the private code repository;
receive a result from the inspector at an inspection environment, wherein the private code repository is inaccessible to the inspection environment, and, wherein the result includes an identifier of the code object and an identifier of a detected cybersecurity object, and wherein the cybersecurity object indicates a cybersecurity issue;
inspect a resource for another cybersecurity object, wherein the resource is deployed in the cloud computing environment based on the code object;
detect the cybersecurity issue based on detecting the cybersecurity object and the another cybersecurity object; and
generate a representation of: the code object in a security database based on the received result, the resource, and the detected cybersecurity object, wherein the security database includes a representation of the cloud computing environment.

7. A system for inspecting private code repositories for cybersecurity issues comprising:
one or more processors configured to:
access a private code repository, the private code repository including a plurality of code objects, wherein the private code repository is accessible to a cloud computing environment;
generate a pull request including code for an inspector, the inspector configured to detect a cybersecurity object in a code object of the plurality of code objects;
initiate the pull request in the private code repository;
receive a result from the inspector at an inspection environment, wherein the private code repository is inaccessible to the inspection environment, and, wherein the result includes an identifier of the code object and an identifier of a detected cybersecurity object, and wherein the cybersecurity object indicates a cybersecurity issue;
inspect a resource for another cybersecurity object, wherein the resource is deployed in the cloud computing environment based on the code object;
detect the cybersecurity issue based on detecting the cybersecurity object and the another cybersecurity object; and
generate a representation of: the code object in a security database based on the received result, the resource, and the detected cybersecurity object, wherein the security database includes a representation of the cloud computing environment.

8. The system of claim 7, wherein the one or more processors are further configured to:
generate the pull request in a project of a version control system (VCS), the project associated with an inspection environment.

9. The system of claim 7, wherein the one or more processors are further configured to:
configure an inspection controller in an inspection environment to analyze metadata of the private code repository; and
generate code for the inspector based on the analyzed metadata.

10. The system of claim 7, wherein the one or more processors are further configured to:
generate an inspectable disk based on an original disk of the resource; and
inspect the inspectable disk for the another cybersecurity object.

11. The system of claim 7, wherein the one or more processors are further configured to:
terminate the inspector in the private code repository.

* * * * *